May 15, 1928.

C. I. POLLARD 1,669,672

MACHINE FOR MANUFACTURING HEELS FOR SHOES

Filed July 10, 1923

INVENTOR.
Carl Ingalls Pollard,
BY Toulmin & Toulmin
ATTORNEYS.

May 15, 1928.  
C. I. POLLARD  
1,669,672  
MACHINE FOR MANUFACTURING HEELS FOR SHOES  
Filed July 10, 1923  9 Sheets-Sheet 5

Inventor  
Carl Ingalls Pollard,  
By Toulmin & Toulmin,  
Attorneys

May 15, 1928. 1,669,672
C. I. POLLARD
MACHINE FOR MANUFACTURING HEELS FOR SHOES
Filed July 10, 1923 9 Sheets-Sheet 9

Patented May 15, 1928.

1,669,672

UNITED STATES PATENT OFFICE.

CARL INGALLS POLLARD, OF PORTSMOUTH, OHIO, ASSIGNOR OF ONE-HALF TO THE VULCAN LAST COMPANY, OF PORTSMOUTH, OHIO, A CORPORATION OF OHIO.

MACHINE FOR MANUFACTURING HEELS FOR SHOES.

Application filed July 10, 1923. Serial No. 650,622.

My invention relates to a machine for manufacturing heels for shoes.

It is the object of my invention to provide a machine which will manufacture heels for shoes out of wood and the like, and in particular which will form the groove or convex portion of the forward part of the heel.

It is a further object of my invention to provide a method and machine for guiding, holding, and carrying a blank of wood in position beneath the retaining, cutting, and sawing members.

It is a further object of my invention to provide adjustable holding members which will automatically adjust themselves to varying blanks of varying depths.

It is a further object of my invention to provide mechanism for adjusting the cutting knives, and mechanism for adjusting the saws, as well as mechanism for adjusting the pressure bar mechanism for holding the blanks in position.

It is a further object of my invention to provide means for adjusting the position of the guiding mechanism, so that the blanks may be initially guided into position.

It is a further object of my invention to provide lags with adjustable bunters.

It is a further object of my invention to provide lags and bunters, together with guides and pressure bars, which will hold the material in position without the necessity for clamping it upon the lags, so that it is possible to place the wooden blanks being worked upon on the lags in the path of the bunters without further adjustment.

It is a further object of my invention to provide cutting mechanism which may be readily attached and detached for resharpening, repair, and adjustment.

It is my object, in the method of making such heels, or the particular portion of the heel in question, to provide means for transporting the blank of wood in a given path, and to automatically discharge it at the end of the path.

It is also my object in this method to provide means of the character described of supporting the blank and of guiding it into position, where it is yieldingly held independently of any other blank on the carrier, so that its height will determine the position of the holding means, and it will be impossible for any other blank of greater height to disarrange this arrangement.

It is still a further object, while the blank is being transported and held, to at the same time subject it to a cutting operation, then to a truing or sawing operation, and then to a final cutting or polishing action, as the final cutting leaves a very smooth surface.

Referring to the drawings.

Figures 16, 17:
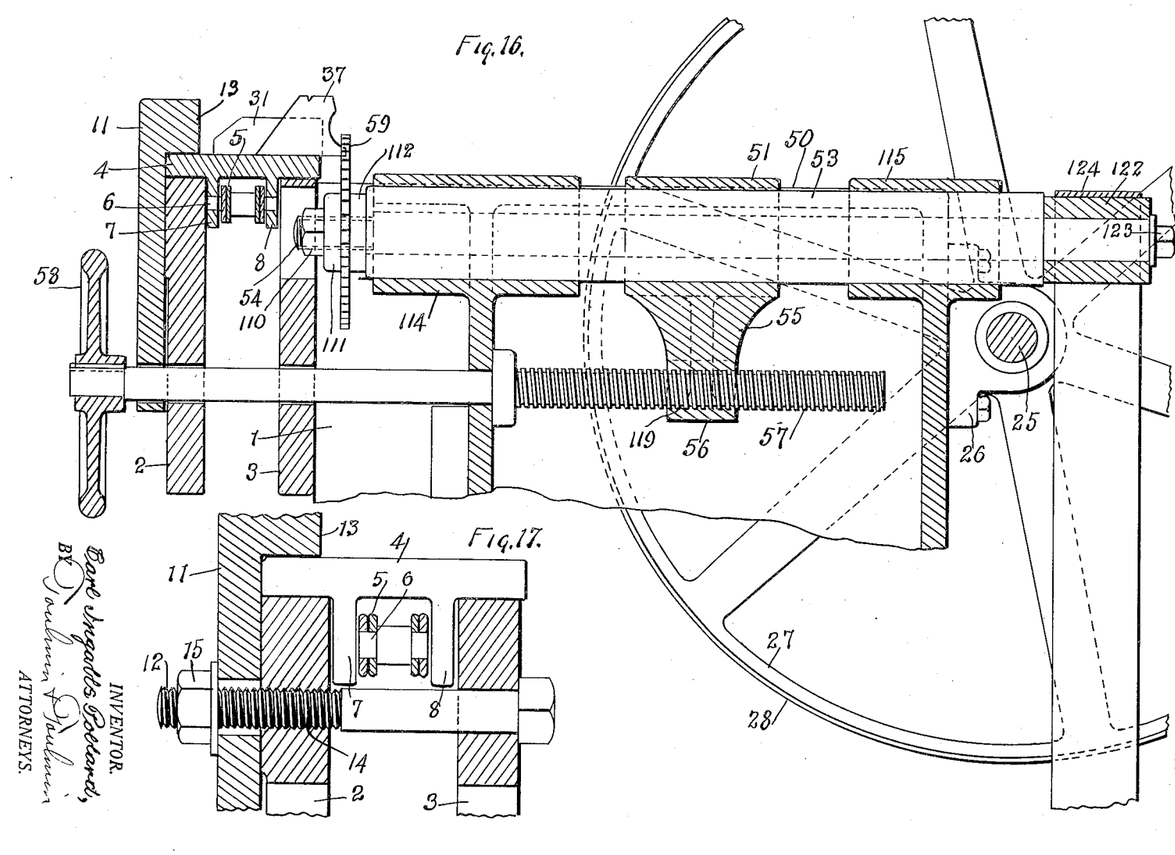
Figure 16 is a section enlarged, taken fore and aft the machine, showing the arrangement and relationship of the saw and its accompanying parts, and the means of positioning the saw.
Figure 17 is a section showing in detail the positioning means for the chain and the lags, and showing the method of adjusting the lag track.

Referring to the drawings in detail:

1 is a base. Mounted on this base are a pair of tracks 2 and 3, which serve to support a series of plates known as lags, which are designated 4. These lags are mounted upon an endless chain 5 by means of a bolt 6 (Fig. 16) passing through a portion of the chain and being pivotally mounted in depending plates 7 and 8 on the bottom of the lag 4. Thus each lag is pivotally mounted on its chain, and when the lags are traveling on the upper side of the chain, they are supported in position by the tracks 2 and 3.

On either end of the machine, on the forward side thereof, there are mounted sprocket wheels 9 and 10 for the purpose of driving the chain and moving the lags in succession from left to right. The lags pass behind and beneath a guard plate 11, which is adjustably mounted by the bolts 12 upon the face of the base 1 adjacent the operator. An overhanging shoulder 13 on the plate 11 prevents the lags from moving upwardly from the track 3. This bolt 12 passes through the tracks 2 and 3.

It is provided with a thread 14, which engages with the track 2, and thus serves to adjust the position of the tracks; this thread also serves to hold the nut 15 on the bolt 12. As the tracks are fixed parts of the frame of the machine, by means of the bolt 12 the guard plate 11 can be adjusted with relation to the travel of the lags.

This arrangement provides a continuously moving chain or belt having thereon a plurality of supports or lags upon which the blanks hereinafter described are mounted to be worked upon by the machine.

Figure 2:
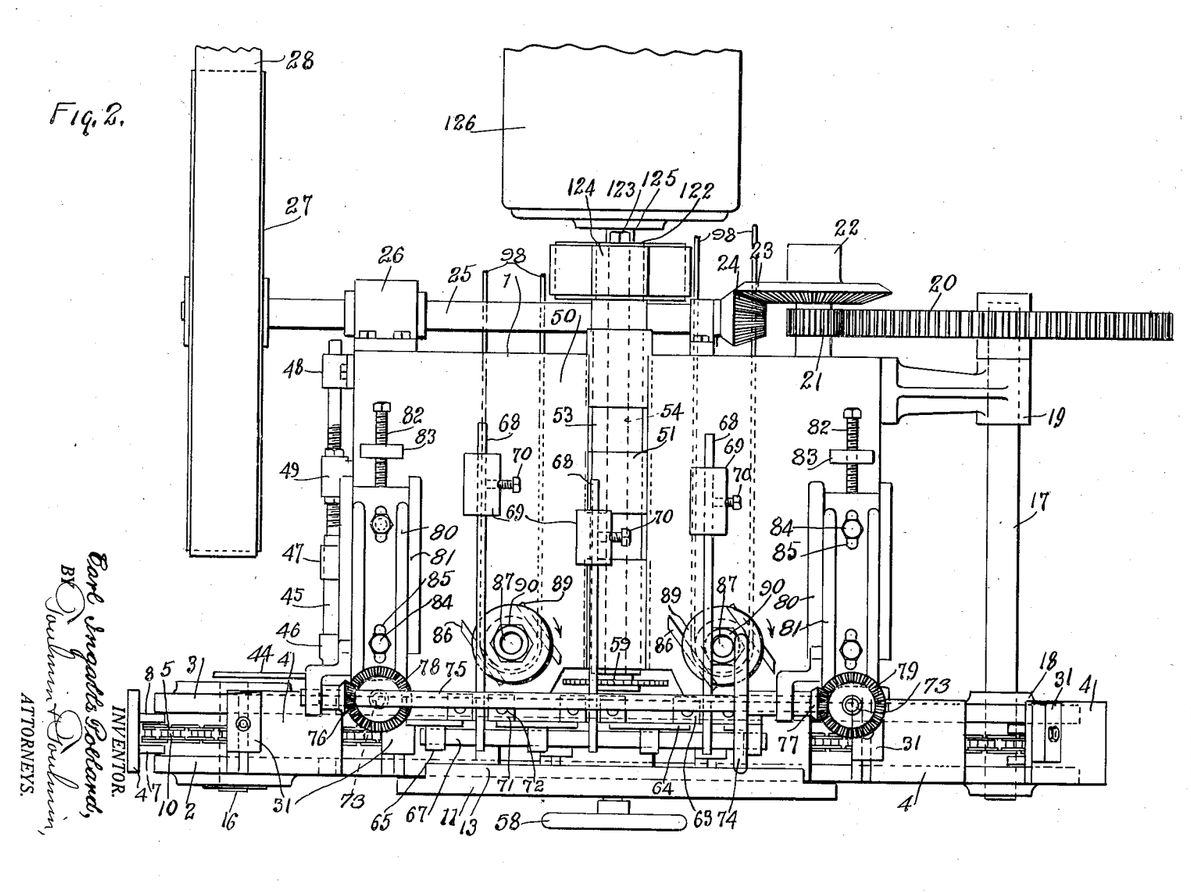
Figure 2 is a plan view of the machine.
Figure 21:
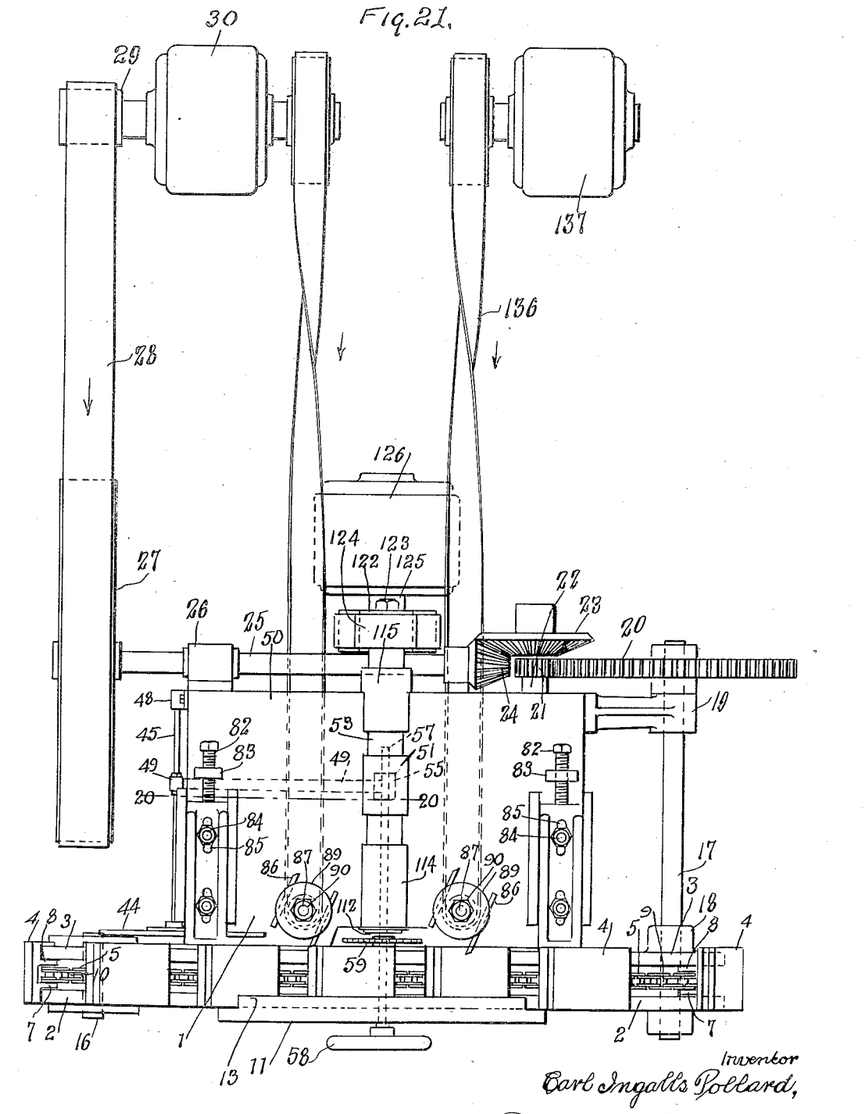
Figure 21 is a plan view of the machine, showing the arrangement of the drives with the superstructure removed.

The sprocket wheels are mounted on the shafts 16 and 17 respectively. The shaft 17 is the driving shaft. It is journaled in the support 18 and the support 19 on the side of the base 1. Its rear end carries a gear 20, which meshes with a pinion 21 on a stub shaft 22, which in turn carries a bevel gear 23. This bevel gear meshes with a second bevel gear or pinion 24 mounted on a shaft 25, which is located parallel to the back of the base 1. This shaft 25 is mounted in bearings 26, 26, on the rear of the base 1. At the outer end of the shaft on the left hand side of the machine, a large pulley 27 is provided to receive a driving belt 28, which is driven in turn from a pulley 29 actuated by an electric motor 30. The details of this drive are best seen in Figures 2 and 21.

Turning again to the lags or carriers on the endless chain or conveyor, it will be observed that the lag carries what is known as a bunter 31. This bunter may be either of the form shown in Figures 11, 12, and 13, or the form shown in Figures 14 and 15, depending upon the type of groove to be imparted to the heel.

Figure 11:
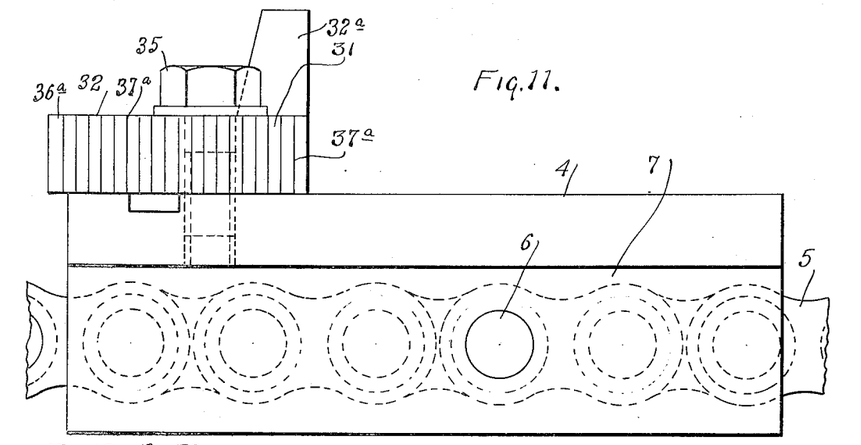
Figure 11 is a side elevation of a lag and a bunter.
Figure 12:
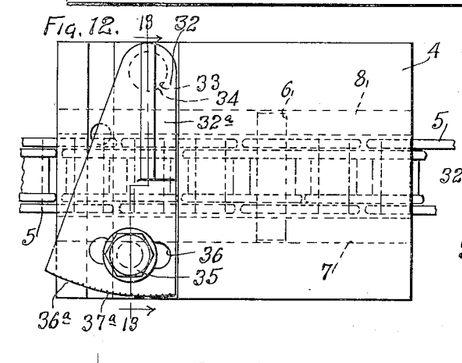
Figure 12 is a plan view of Figure 11.
Figure 13:
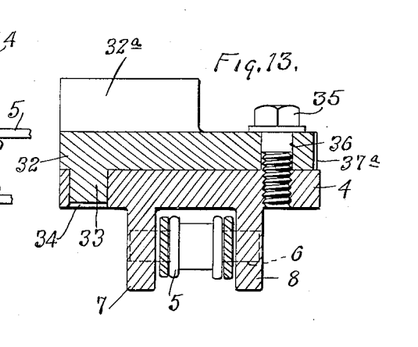
Figure 13 is a section on the line 13—13 of Figure 12.
Figures 14, 15:
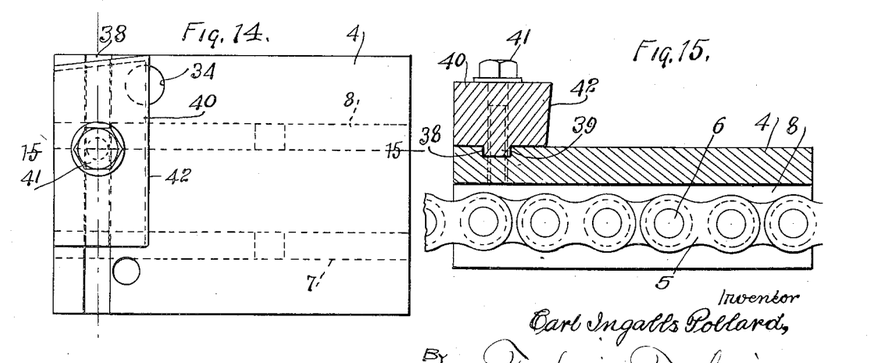
Figure 14 is a plan view of a lag with a different type of bunter.
Figure 15 is a section on the line 15—15 of Figure 14.

In the form shown in Figures 11, 12, and 13, the bunter consists of a segmental plate 32 having a downwardly projecting pin 33 fitting in the socket 34 in the lag, so that it may swing about this pivot as it is adjusted in position. The set-screw 35, which is located in the slot 36 of the bunter is carried also by the lag (see Figure 13). The semicircular end 36ª of the bunter toward the operator has a series of graduations thereon, designated 37ª, in order to enable the operator to set all of the bunters at a predetermined point.

It will be noted that the bunter consists not only of the plate 32, but of an upstanding shoulder 32ª, against which the blank 37 rests.

Turning to the other type of bunter, it will be noted that the lag is provided with a transverse groove 38 in which there travels the shoulder 39 of the bunter block 40. The retaining bolt 41 which passes through the bunter block and the lag serves to position and retain the bunter in position. It will be noted that the side of the bunter block against which the wooden blank rests, as at 42, is sloped downwardly and inwardly for a purpose to be hereinafter described.

Figures 19, 20:
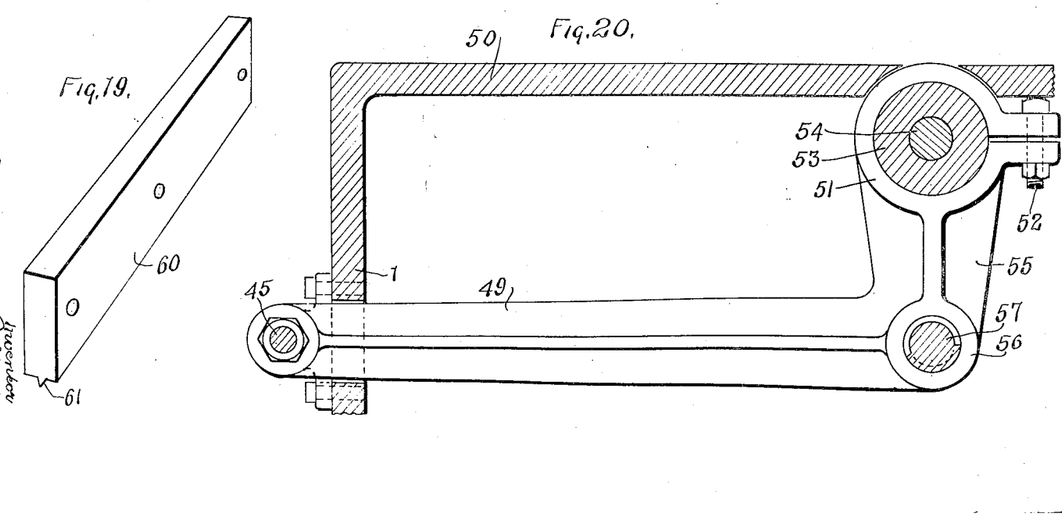
Figure 19 is a perspective of the pressure bar and knife edge carried by the adjustable block.
Figure 20 is a section on the line 20—20 of Figure 21.

When the blank 37 is placed initially on the lag against the bunter, it is also so placed that its forward edge 43 abuts against a guide-plate 44, so that the blanks are all positioned on the bunter transversely thereof in the same way. This guide is supported on a rod 45, and is carried by the head 46 on said rod. This rod is supported in the bearings or eyes 47 and 48 on the left hand of the machine. To the rod is connected a transversely located arm 49 for the purpose of moving the rod and the guide backwardly and forwardly for adjustment of position. (See Figures 2, 20, and 21.) This transverse arm 49 is located beneath the table 50, which is mounted on top of the frame 1. This arm, which extends to the central portion of the machine, is provided with a split collar 51 at the end thereof, which is held together by the bolt 52. This split collar embraces a sliding sleeve 53, which in turn contains the rotating saw-shaft 54. The lower half of the collar is provided with a downwardly extending arm or bracket 55, at the lower end of which is an eye 56, suitably threaded for the reception of an operating worm shaft 57. This operating worm shaft extends outwardly toward the operator and terminates in a handwheel 58 outside of the machine on the front thereof adjacent the operator. The purpose of this mechanism is to provide means for simultaneously moving the guide 44 and the saw 59 which is carried on the saw-shaft 54.

Figure 1:
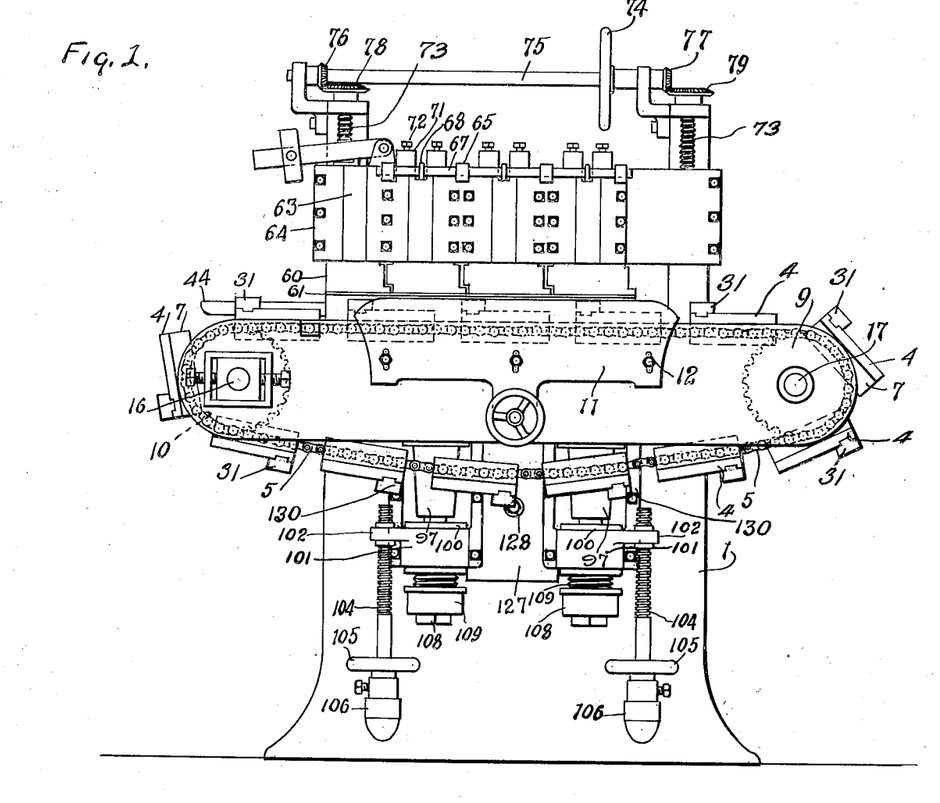
Figure 1 is a front elevation from the operator's side of the machine.
Figures 22, 23, 24:
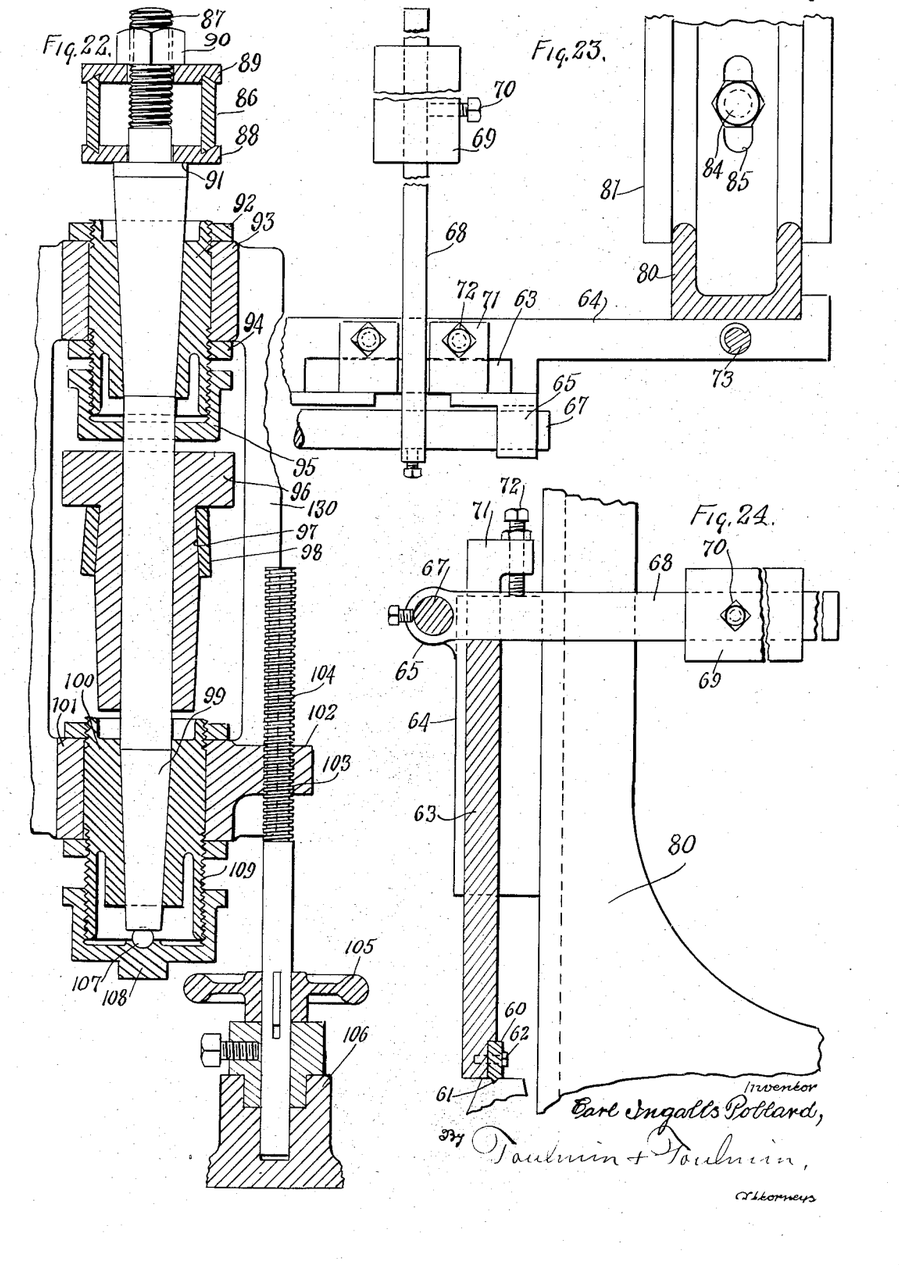
Figure 22 is a detailed section showing the adjusting mechanism and drives, as well as the support for the cutter shaft and the cutters. The section is taken on the line 22—22 of Figure 18.
Figure 23 is a plan view showing a portion of the transverse and vertical adjustment for the pressure bar slides, and a portion of the pressure bar weight mechanism.
Figure 24 is a side elevation of the pressure bar mechanism.

Turning to Figures 1, 23, and 24, it will be seen that, as the blank 37 is carried to the right hand by the conveyor, it passes beneath a pressure bar 60, having a V-shaped shoulder 61 on the bottom thereof for engaging with the soft wood of the blank to prevent it moving laterally. This pressure bar 60 is carried by the bolt 62 on the bottom of a block 63, which is adapted to move vertically in a guide frame 64. Mounted in this guide frame are eyes 65 supporting the shaft 67, said shaft in turn attached to the end of a plurality of arms 68, each one of which rests upon the top of the sliding block 63, to keep the block and the pressure bar in engagement with a wooden blank 37. Adjustable weights 69 are carried on the outer ends of these arms 68, and held in position by the set-screws 70. Retaining lugs 71, held in position by the bolts or screws 72, limit the upward movement of the block 63. The whole guide-frame or carrier 64 is adapted to be elevated by the worms 73 at its ends. These worms are actuated by a handwheel 74 on the cross-shaft 75 which carries the bevel gears 76 and 77 meshing with the bevel gears 78 and 79 on the upper ends of the worms 73.

This carrier 64 has fore and aft movement to and from the operator imparted to it by the following means. A slide 80 is provided at either end of the gear adjacent the worm 73 at either end thereof. These slides move in guide-ways 81 carried by the table. The slides themselves are actuated by the set-screws 82 working in the eyes 83 carried by the table. After the set-screws have positioned the slides, they are fixed in position by the bolts 84, which pass through the slots 85 in the slide 80. Thus it is possible to secure both a vertical and fore and aft adjustment of the guide-way for the blocks and pressure bars.

Figures 3, 4:
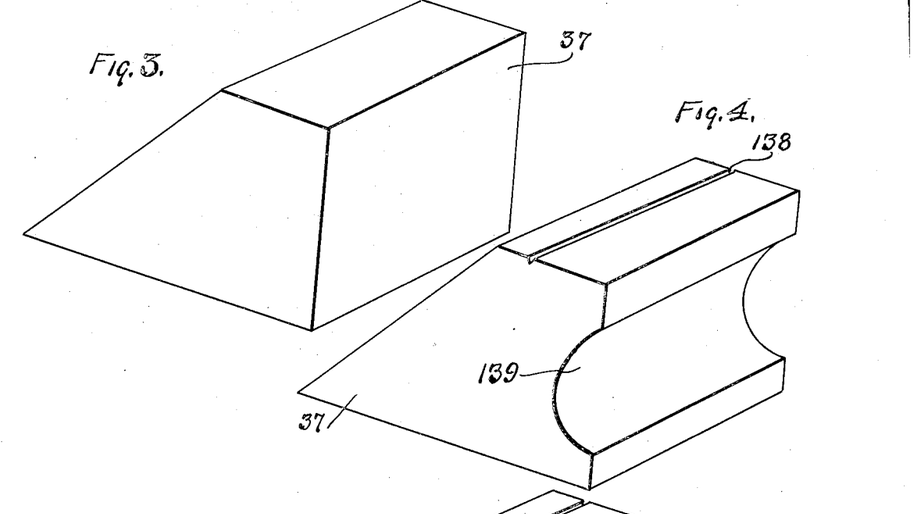
Figure 3 is a perspective of the blank of wood before it is worked upon.
Figure 4 is a blank of wood after the first cutting operation, showing the groove in the top of the blank resulting from the yielding holding mechanism having engaged the block.
Figure 5:
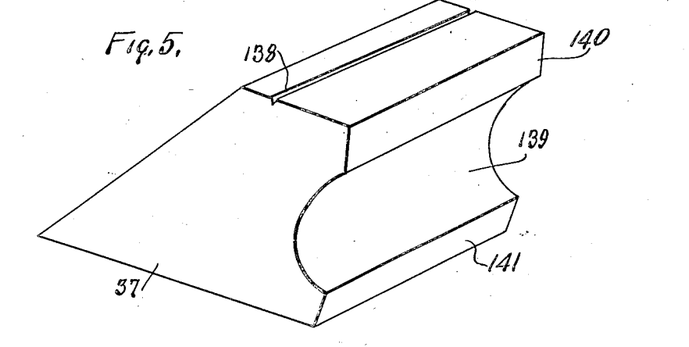
Figure 5 is a similar perspective of the blank after it has been trued by the saw.
Figure 6:
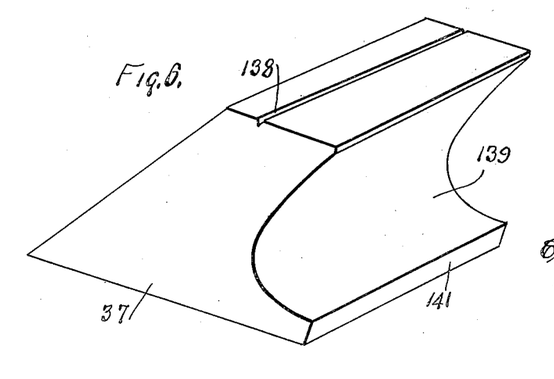
Figure 6 is a similar view of the blank in its finished condition, after the second knife has completed the final cutting operation.
Figures 7, 8:
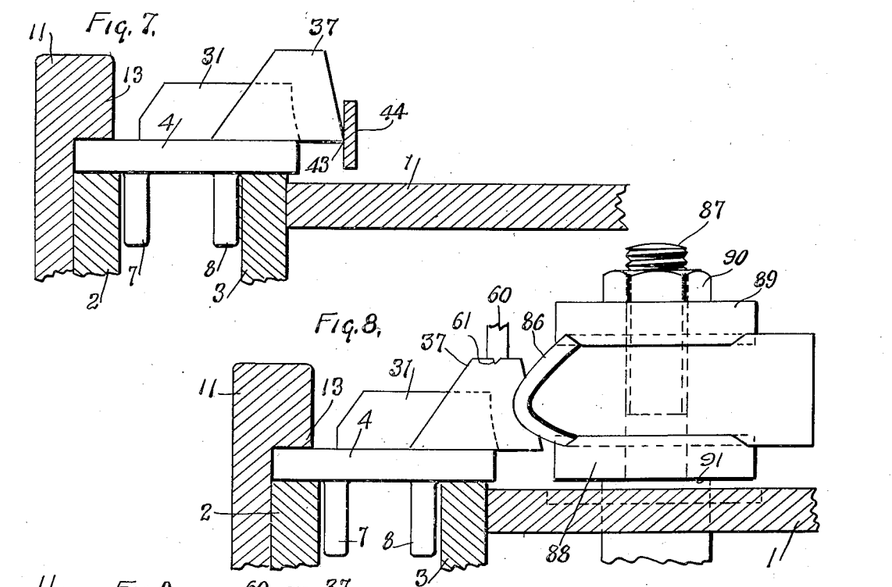
Figure 7 is a detailed section showing the position of the blank when it is first located upon the lag adjacent the bunter and abutting the guide, before it passes into the machine beneath the holding mechanism.
Figure 8 illustrates the position of the knife when working upon the blank during the first cutting operation.

After the blank has passed beneath the pressure bar, it is in position for the first cutting operation, the result of which is shown in Figure 4. Figure 8 shows the blank 37 in position as it is being trimmed by the knife 86. This knife is carried upon a vertical shaft (see Figs. 8 and 22) designated 87. It is supported in a lower knife-block 88 and engaged on the top by the knife-block 89, which in turn is engaged by the nut 90. The lower knife-block is supported on the shoulder 91 of the shaft. This shaft tapers inwardly and downwardly from the shoulder to form a bearing surface for engagement with the bearing 92, which is supported in the collar 93, mounted on the threaded washer 94. Suitable means may be provided for lubricating this bearing as desired. The lower part of the bearing is enclosed by a cup 95. A pulley is provided below this bearing on this shaft 87, consisting of a retaining collar 96 and an upwardly and inwardly tapering surface 97, which prevents the belt 98 from slipping downwardly on the pulley.

Below this pulley is the lower bearing in which the tapered portion 99 of the shaft fits. The bearing member is designated 100, and is supported by a collar 101, carrying an arm 102, which is internally threaded at 103 for the reception of the screw 104. This screw is actuated by the handwheel 105, and is supported by the base-block 106. The base of the shaft 87 rests upon a ball 107, which in turn is supported by an internally threaded cup 108, which is held on a threaded apron 109 depending from the bearing block 100.

Thus it is possible to adjust this shaft and its knives vertically by turning the handwheel 105.

The next step in the operation on the blank is to move it adjacent the saw 59 which is carried on the saw-shaft 54. On the end of the saw-shaft 54 is threaded a nut 110, which engages a collar carried on the shaft designated 111. The saw 59 is embraced between this collar and the head 112 of the sleeve 53. This sleeve surrounds the shaft 54. The assembly is supported in the bracket 114 at its forward end, and in the bracket 115 at its rear end. A collar 51 is carried on this sleeve, and has a depending bracket 55 at the bottom of which is an eye internally threaded at 119 to receive a worm 57, which is mounted in the bracket 114. This worm is actuated by the handwheel 58. As this handwheel is rotated, 51 and 55 are moved inwardly or outwardly, thereby moving the saw and the shaft inwardly or outwardly. The shaft is actuated by the pulley 122 mounted on its inner end and retained thereon by the nut 123. This pulley is in turn actuated by the belt 124. This belt passes downwardly to engagement with the shaft 125 of the motor 126. (See Fig. 21.)

Figures 9, 10:
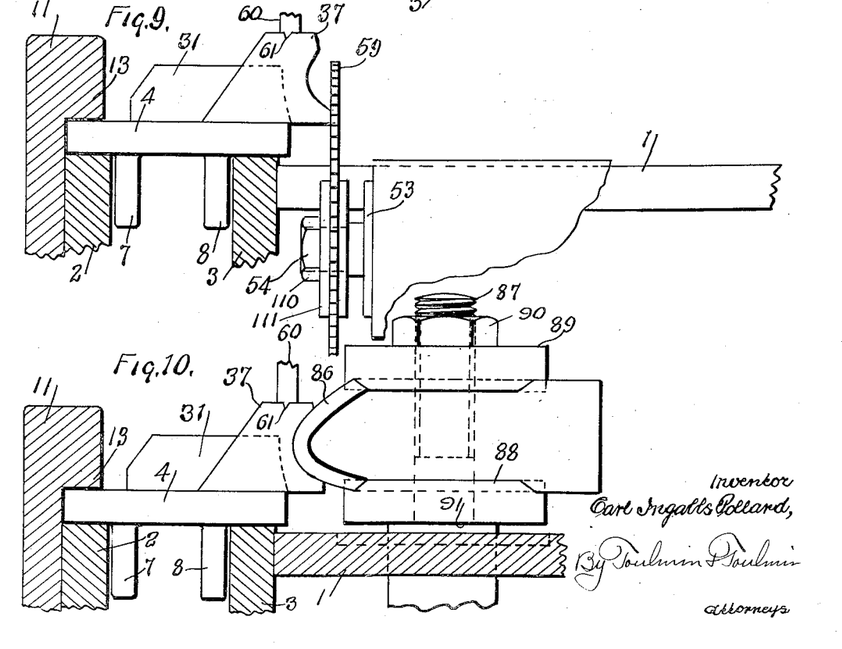
Figure 9 is a similar view showing the truing operation of the saw working on the blank.
Figure 10 is a similar view showing the second knife performing the final cutting operation.

After passing by the saw, the blank is engaged by the second knife, as shown in Figure 10, which is similarly constructed, supported, and driven, as well as adjusted to the knife and its accompanying mechanism already described.

Figure 18:
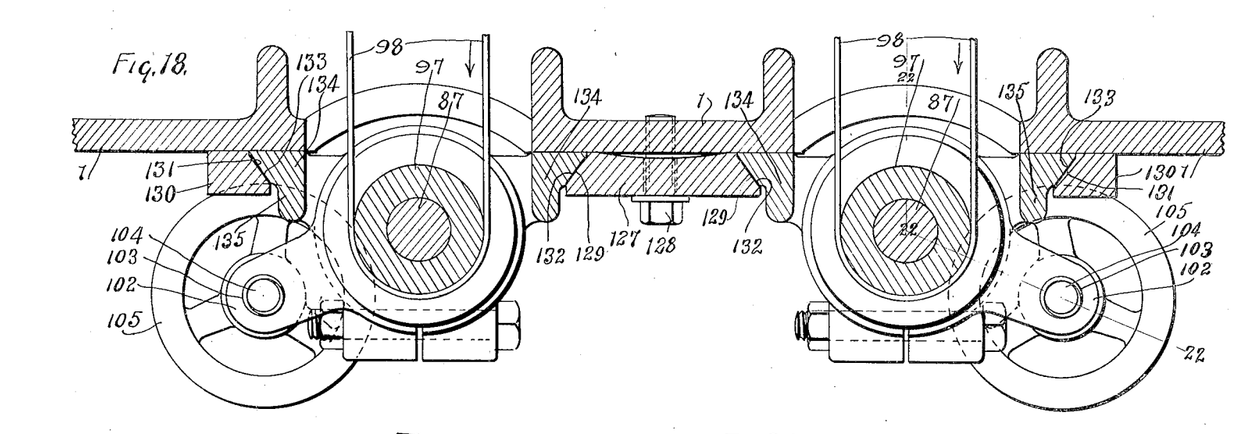
Figure 18 is a transverse section showing the arrangement of the driving mechanism for the knives and their shafts.

This arrangemnt is clearly shown in Figure 18. The base or frame 1 carries the slide-block 127, which is retained on the base by the bolt 128. This slide-block is inwardly beveled as at 129 on either side.

On either side of the face of the base 1 are blocks 130, having inwardly beveled 131. The respective beveled faces 131 engage with corresponding beveled 132 and 133. The shoulders 134 having the beveled surfaces 133 and carried on the collars 101 and 93. The right hand knife-shaft is driven by the belt 136 from the motor 137.

Turning to the product itself, it will be seen that the blank 37 of Figure 3 acquires a groove 138 due to the pressure thereon of the edge 61. The first pair of knives cut a groove 139 in the face of the blank. The saw straightens the faces 140 and 141, while the second pair of knives put the finishing curvature to the face 139, thus reducing the area of the face 141.

Operation.

The machine is started by turning on the power, whereupon the conveyor moves and the knives and saw revolve. The operator places a blank against the bunter on the lag, with its forward edge against the guide. It is then carried beneath the knife edge 61 and the pressure bar 60 of the first presser-block 63, and while so held in position by the successive pressure bars it is first cut by the knives, then trimmed by the saw, then finished by the knives, and then carried out and ejected by being dumped from the surface of the lag, having been freed from the last pressure bar. All blanks are thus treated alike, irrespective of their dimensions or height. When the guide is adjusted in position, the saw is likewise adjusted for finishing the faces of the blank. Adjustments are provided for the vertical and transverse movements of the pressure block carrier. Adjustments are also provided for locating the knives in position.

In case of wear of the track or the lags, suitable adjustments can be made to maintain the parts in their proper operative relationships. These adjustments are of great importance to adapt the machine to various types, dimensions, and curvatures of heel. They are also important for taking up wear on the parts.

The sprocket shaft 16 is carried in a block 114ª, which is adjusted in position in the frame 116 by the set-screws 117.

It will be understood that I desire to comprehend within my invention such modifications as may be fairly embraced within it, and as may be found necessary in adapting it to various conditions in the art in the course of the application of the invention.

By changing the blank so that it lies on its side, the groove may be so arranged that it is possible to manufacture a Cuban heel as distinguished from the French heel, in which the curvature is in a different direction and of a different character, as heretofore described.

It will also be observed that the guide 44 can be adjusted independently of the saw adjustment by actuating the collar 49 after loosening the setting nuts.

Having thus fully described my invention, what I claim as new, and desire to secure by Letters Patent, is:

1. In a heel-grooving machine, the combination of a support, a conveyor, a plurality of lags thereon, a bunter on each of said lags, a guide to guide blanks into position on said lags, a plurality of separable pressure bars operating on each blank independently, a pair of spaced grooving means, a facing means interposed therebetween, means for adjusting said facing means and said guiding means simultaneously inwardly and outwardly, means for adjusting said pressure bars as a unit vertically and inwardly and outwardly, and means for adjusting said grooving means vertically.

2. In a heel-grooving machine, the combination of tracks, a conveyor, a plurality of lags thereon, a bunter on each of said lags, a guide to guide blanks into position on said lags, a plurality of separable pressure bars operating on each blank independently, a pair of spaced grooving means, a facing means interposed therebetween, means for adjusting said facing means and said guiding means independently inwardly and outwardly, means for adjusting said pressure bars as a unit vertically and inwardly and outwardly, and means for adjusting said grooving means vertically.

3. In a heel-grooving machine, the combination of a support, a transversely moving conveyor having lags and bunters thereon, a pair of vertical grooving heads having grooving knives and their shafts adjacent said lags, a horizontally disposed facing saw between said grooving heads, a carrier having a portion overlying said lags, a plurality of independent pressure bars and guiding means therefor mounted on the support and vertically slidable, means to maintain said pressure bars in their lowermost position independently of one another, a guide connected to said facing saw for guiding blanks into a proper position beneath the pressure bars to be worked upon by the machine, means for adjusting blanks on said lags relative to said conveyor tracks on said support, means for driving said saw-facing means, and means for driving said grooving heads and their shafts independently of one another, one of said means being adapted to actuate said conveyor.

4. In a heel-grooving machine, a conveyor, a support, means for actuating said conveyor, a plurality of lags and bunters on said conveyor, a grooving means, a vertically and laterally adjustable holder overlying the lags, a plurality of blocks adapted to move vertically therein, a plurality of independent weights adapted to engage each of said blocks and force each of said blocks downwardly, and detachable pressure bars with engaging knife edges on the base thereof carried by each of said blocks, whereby blanks mounted on said lags will engage successively and independently said pressure bars, which will automatically adjust themselves in position to the height of said blanks, irrespective of the height of any other blank.

5. In a heel-grooving machine, the combination of a supporting frame and a plurality of successively operating blank-trimming mechanisms horizontally disposed in said frame, with means for feeding blanks past the trimming mechanisms comprising a horizontal guideway mounted on the supporting frame adjacent to the trimming mechanisms, a plurality of lags for carrying blanks adapted to travel on the guideway, an endless conveyor for moving the lags along the guideway, a carrier adjustable on the supporting frame relatively to the travel of the lags, a series of independent presser-blocks movably mounted on the carrier to cooperate successively with the travelling lags to hold the blanks as the latter are subjected to the trimming mechanism, independent means normally pressing each presser-block to cooperate with the lags in holding the blanks, and means for moving the carrier on the supporting frame to adjust the series of presser-blocks as a whole with relation to the travel of the lags.

6. In a heel-grooving machine, the combination of a supporting frame and a plurality of successively operating blank-trimming mechanisms horizontally disposed in said frame, with means for feeding blanks past the trimming mechanisms comprising a horizontal guideway mounted on the supporting frame adjacent to the trimming mechanism, a plurality of lags for carrying blanks adapted to travel on the guideway, an endless conveyor for moving the lags along the guideway, a carrier adjustable on the supporting frame relatively to the travel of the lags, a series of independent presser-blocks movably mounted on the carrier, edged bars mounted on the presser-blocks to be pressed into engagement with the blanks carried by the lags, independent means normally pressing each presser-block to force its edged bar into engagement with the blank carried by a passing lag, and means for moving the carrier on the supporting frame to adjust the series of presser-blocks as a whole with relation to the travel of the lags.

7. In a heel-grooving machine, the combination of a main supporting frame and a plurality of successively operating blank-trimming mechanisms horizontally disposed in said frame, with means for feeding blanks past the trimming mechanisms comprising a horizontal guideway mounted on the main frame and extending past the trimming mechanisms, a plurality of lags for carrying blanks adapted to travel on the guideway, an endless conveyer for moving the lags along the guideway, an auxiliary frame horizontally movable on the main frame, a carrier vertically movable on the auxiliary frame, a series of independent presser-blocks movably mounted on the carrier to cooperate successively with the travelling lags to hold the blanks as the latter are presented to the trimming mechanisms, independent means normally pressing each presser-block to cooperate with the lags in holding the blanks, means for moving the carrier on the auxiliary to adjust the series of presser-blocks as a whole in vertical relation to the travel of the lags, and means for moving the auxiliary frame to adjust the series of presser blocks as a whole in horizontal relation to the travel of the lags.

8. In a heel-grooving machine, the combination of a main supporting frame and a plurality of successively operating blank-trimming mechanisms horizontally disposed in said frame, with means for feeding blanks past the trimming mechanism comprising a horizontal guideway mounted on the main frame and extending past the trimming mechanisms, a plurality of lags for carrying blanks adapted to travel on the guideway, an endless conveyor for moving the lags along the guideway, an auxiliary frame horizontally adjusted on the main frame to and from the travel of the lags, a carrier vertically adjustable on the auxiliary frame to and from the travel of the lags, said carrier having a plurality of vertical guide grooves, a series of presser-blocks independently movable in the guide grooves, and an individual means for each presser-block normally pressing the presser-foot to cooperate with the passing lags to hold the blanks with relation to the trimming mechanism.

9. In a heel-grooving machine, the combination with a lag having a work-face for the positioning of blanks thereon, of a bunter movably engaging the lag for horizontal adjustment on the work-face of the lag, said bunter having an exterior work-face angularly disposed to the work-face of the lag and adapted to engage a side of a blank positioned on the work-face of the lag, and a bolt extending through the bunter and lag to clamp the bunter in place in its horizontal adjustments on the work-face of the lag, the said bunter comprising a plate and shoulder with a plurality of graduations on the plate, whereby the bunter may be set at a predetermined point.

10. In a heel-grooving machine, the combination with a lag having a work-face for the positioning of blanks thereon, of a bunter pivoted to the lag by a vertical pivot to provide horizontal angular adjustment of the bunter on the work-face of the lag, said bunter having an exterior work-face angularly disposed to the work-face of the lag and adapted to engage a side of a blank positioned on the work-face of the lag, and a bolt extending through the bunter and lag to clamp the bunter in place in its adjustments on the work-face of the lag, the said bunter comprising a plate and shoulder, with a plurality of graduations on the plate, whereby the bunter may be set at a predetermined point.

11. In a heel-grooving machine, the combination with a lag having a work-face for the positioning of blanks thereon, of a bunter pivoted at one end to the lag by a vertical pivot to provide horizontal angular adjustment of the bunter on the work-face of the lag, said bunter having a slot in its free end, said bunter also having an exterior work-face angularly disposed to the work-face of the lag and adapted to engage a side of a blank positioned on the work-face of the lag, and a bolt mounted in the lag and extending through the slot in the bunter for clamping the bunter in place in its adjustments on the work-face of the lag, the said bunter comprising a plate and shoulder, with a plurality of graduations on the plate, whereby the bunter may be set at a predetermined point.

In testimony whereof, I affix my signature.

CARL INGALLS POLLARD.